(12) United States Patent
Ko et al.

(10) Patent No.: US 12,558,788 B2
(45) Date of Patent: Feb. 24, 2026

(54) SYSTEM AND METHOD FOR REAL-TIME ANIMATION INTERACTIVE EDITING

(71) Applicants: Inventec (Pudong) Technology Corp., Shanghai (CN); Inventec Corporation, Taipei (TW)

(72) Inventors: Chong-Qi Ko, Taipei (TW); Guilherme Henrique Galelli Christmann, Taipei (TW); Ying-Sheng Luo, Taipei (TW); Wei-Chao Chen, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 200 days.

(21) Appl. No.: 18/412,614

(22) Filed: Jan. 15, 2024

(65) Prior Publication Data

US 2025/0153358 A1     May 15, 2025

(30) Foreign Application Priority Data

Nov. 13, 2023    (CN) .......................... 202311511238.6

(51) Int. Cl.
*B25J 9/16*         (2006.01)
*G06T 13/40*      (2011.01)
(52) U.S. Cl.
CPC ............. *B25J 9/1671* (2013.01); *G06T 13/40* (2013.01); *G06T 2200/24* (2013.01)
(58) Field of Classification Search
CPC .... B25J 9/1671; G06T 13/40; G06T 2200/24; G06T 13/20; G06T 19/20
See application file for complete search history.

(56) References Cited

U.S. PATENT DOCUMENTS

| | | | | |
|---|---|---|---|---|
| 12,033,261 | B2 * | 7/2024 | Villegas | .................. G06T 7/215 |
| 12,122,053 | B2 * | 10/2024 | Chen | .................... G06N 3/0499 |
| 2006/0139355 | A1 * | 6/2006 | Tak | .......................... G06T 13/40 |
| | | | | 345/473 |
| 2013/0066750 | A1 * | 3/2013 | Siddique | ................ G06Q 20/12 |
| | | | | 705/27.2 |
| 2021/0110089 | A1 * | 4/2021 | Chen | ........................ B25J 9/163 |

(Continued)

*Primary Examiner* — Michael Le
(74) *Attorney, Agent, or Firm* — Winston Hsu

(57) ABSTRACT

A system for real-time animation interactive editing is provided. The system for real-time animation interactive editing includes a physics simulation platform and an animation processing device. The animation processing device includes an animation editing circuit and a comparison processing circuit. The animation editing circuit is configured to obtain a motion animation associated with a robot and provide the motion animation to the physics simulation platform, such that the physics simulation platform performs a simulation processing based on the motion animation to generate a simulation result. The comparison processing circuit is configured to real-time obtain the simulation result generated by the physics simulation platform, and compare the simulation result with the motion animation to generate a comparison result. The animation editing circuit is configured to edit the motion animation according to the comparison result to generate an edited motion animation and provide the edited motion animation to the physics simulation platform.

6 Claims, 3 Drawing Sheets

(56)  References Cited

U.S. PATENT DOCUMENTS

| 2023/0267666 A1* | 8/2023 | Minor | G06N 3/04 |
| | | | 345/419 |
| 2023/0294276 A1* | 9/2023 | Chao | B25J 9/1605 |
| | | | 700/250 |
| 2023/0306667 A1* | 9/2023 | Hopkins | G06F 30/20 |
| 2025/0061637 A1* | 2/2025 | Kapadia | G06T 13/40 |

* cited by examiner

SYSTEM AND METHOD FOR REAL-TIME ANIMATION INTERACTIVE EDITING

BACKGROUND OF THE INVENTION

1. Field of the Invention

The present invention relates to a system and method for real-time animation interactive editing, and more particularly, to a system and method for real-time animation interactive editing, which can be utilized for robot action training.

2. Description of the Prior Art

Robots have been widely applied in various fields. For example, for entertainment application, robots can imitate human behaviors in the real world to provide people with more fun, such as running and jumping. For rescue application, robots can enter the dangerous environment to search the trapped people and also provide instant information to help rescue teams to complete the rescue task. For scientific research, robots may be able to reach the places where people cannot reach or hard to reach, and collect data, such as geological surveys, environmental monitoring, and wildlife research. In order to achieve the above-mentioned applications, how to enable the robot to achieve the target motions in any environment should be a very important issue. A common approach is to use motion capture or manual editing to obtain motion animations, and send the animations to a physics simulation platform. The physics simulation platform can be used to train a strategy that can accomplish the target action in any environment. In current simulation and training process, the robot may perform wrong or unexpected actions, which would lead to poor and insufficient training results. However, during the simulation and training operation process of current physics simulation platform, the training results cannot be known until the whole training process is completed. As such, if the training result is poor, the simulation and training process must start over from the beginning to re-execute whole simulation and training process, thus resulting in high computation time and cost. Thus, there is a need for improvement.

SUMMARY OF THE INVENTION

It is therefore a primary objective of the present invention to provide a system and method for real-time animation interactive editing utilized for robot action training, in order to resolve the aforementioned problems.

The present invention discloses a system for real-time animation interactive editing, comprising: a physics simulation platform; and an animation processing device, comprising: an animation editing circuit configured to obtain a motion animation associated with a robot and provide the motion animation to the physics simulation platform, such that the physics simulation platform performs a simulation processing based on the motion animation to generate a simulation result; and a comparison processing circuit, configured to real-time obtain the simulation result generated by the physics simulation platform and compare the simulation result with the motion animation to generate a comparison result; wherein the animation editing circuit is configured to edit the motion animation to generate an edited motion animation according to the comparison result and provide the edited motion animation to the physics simulation platform.

The present invention further discloses a method for real-time animation interactive editing, comprising: obtaining a motion animation associated with a robot and providing the motion animation to a physics simulation platform, such that the physics simulation platform performs a simulation processing based on the motion animation to generate a simulation result; real-time obtaining the simulation result generated by the physics simulation platform and comparing the simulation result with the motion animation to generate a comparison result; and editing the motion animation to generate an edited motion animation according to the comparison result and providing the edited motion animation to the physics simulation platform.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
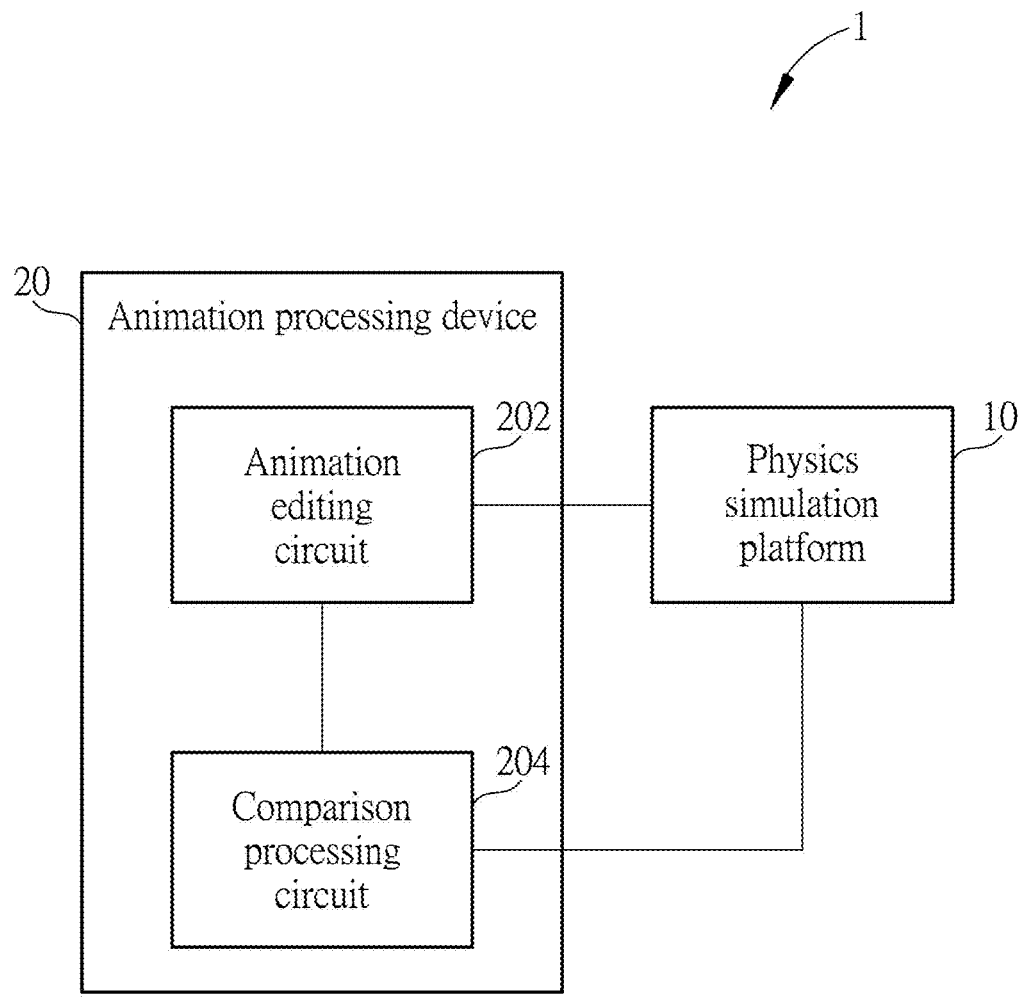
FIG. 1 is a schematic diagram of a system for real-time animation interactive editing according to an embodiment of the present invention.

Please refer to FIG. 1, which is a schematic diagram of a real-time animation interactive editing system 1 according to an embodiment of the present invention. The real-time animation interactive editing system 1 includes a physics simulation platform 10 and an animation processing device 20. The animation processing device 20 includes an animation editing circuit 202 and a comparison processing circuit 204. The animation editing circuit 202 is couple to the comparison processing circuit 204 and the physics simulation platform 10. The animation editing circuit 202 is configured to obtain a motion animation associated with a robot and provide the motion animation to the physics simulation platform 10. The physics simulation platform 10 is configured to perform a simulation processing based on the motion animation to generate a simulation result. The robot may be a quadruped robot, but not limited thereto. The physics simulation platform 10 may be an Isaac Gym simulation platform, but not limited thereto. The comparison processing circuit 204 is coupled to the animation editing circuit 202 and the physics simulation platform 10. The comparison processing circuit 204 is configured to real-time obtain the simulation result generated by the physics simulation platform 10 based on the simulation processing with the motion animation, so as to generate a simulation result. Moreover, the animation editing circuit 202 is configured to edit the motion animation according to the comparison result to generate an edited motion animation and provides the edited motion animation to the physics simulation platform 10.

Figure 2:
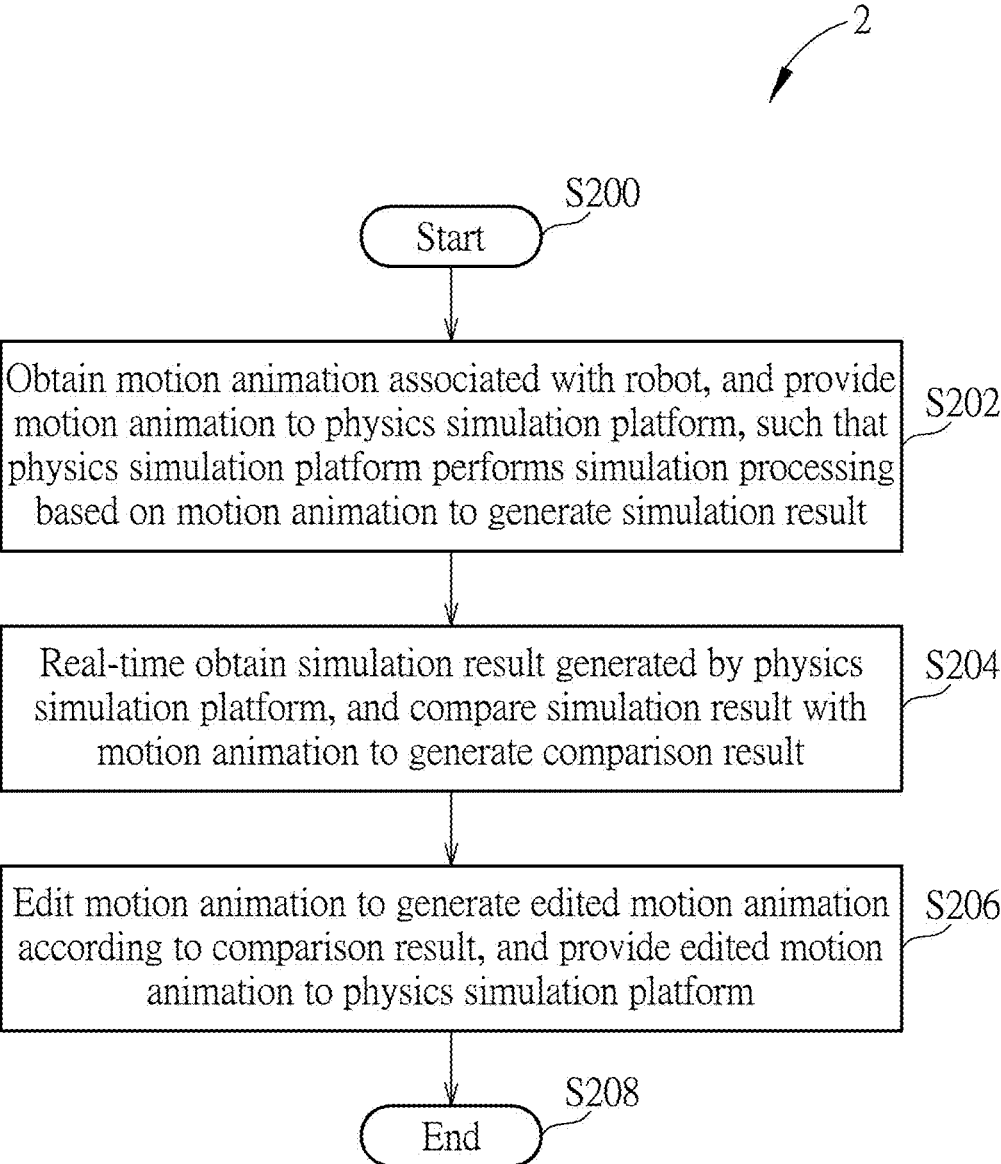
FIG. 2 is a flow diagram of a procedure according to an embodiment of the present invention.

Please refer to FIG. 2. FIG. 2 is a flow diagram of a procedure 2 according to an embodiment of the present invention. The procedure 2 includes the following steps:

Step S200: Start.

Step S202: Obtain a motion animation associated with a robot and provide the motion animation to the physics simulation platform, such that the physics simulation platform performs a simulation processing based on the motion animation to generate a simulation result.

Step S204: Real-time obtain the simulation result generated by the physics simulation platform, and compare the simulation result with the motion animation to generate a comparison result.

Step S206: Edit the motion animation to generate an edited motion animation according to the comparison result, and provide the edited motion animation to the physics simulation platform.

Step S208: End.

According to the procedure 2, in Step S202, the animation editing circuit 202 obtains a motion animation associated with a robot and provides the motion animation to the physics simulation platform 10, such that the physics simulation platform 10 performs a simulation processing based on the motion animation to generate a simulation result.

In Step S204, while performing the simulation and training processing b, the physics simulation platform 10 may simultaneously return the simulation results generated by performing simulation and training processing based on the motion animation to the animation processing device 20, and the physics simulation platform 10 may also store and record the simulation results. As a result, the comparison processing circuit 204 of the animation processing device 20 may real-time obtain the simulation results from the physics simulation platform 10. Since the comparison processing circuit 204 real-time obtains the simulation results from the physics simulation platform 10, the comparison processing circuit 204 may analyze the simulation results generated by the physics simulation platform 10 to determine frames with abnormal events. Therefore, the comparison processing circuit 204 may real-time obtain the simulation result generated by the physics simulation platform 10, and compare the simulation result with the motion animation to generate a corresponding comparison result indicating whether there is a difference between the simulation result and the original inputted motion animation.

In Step S204, while obtaining the simulation result from the physics simulation platform 10 in real time, the comparison processing circuit 204 is configured to compare the simulation result with the motion animation frame by frame to generate the corresponding comparison result. For example, the comparison processing circuit 204 may compare contents in a first frame of the simulation result with contents in the first frame of the motion animation to generate a comparison result. The comparison processing circuit 204 may compare contents in a second frame of the simulation result with contents in the second frame of the motion animation to generate a comparison result, and the like.

In Step S204, the comparison processing circuit 204 is configured to compare a property of the robot in a frame of the simulation result (e.g., n-th frame of the simulation result) with the property of the robot in a corresponding frame of the motion animation (e.g., n-th frame of the motion animation) to generate the comparison result. The property of the robot may include a position, an angle of rotation, a position of an action, an angle of rotation of the action, a position of a joint and/or an angle of rotation of the joint of the robot, but not limited thereto. The position of the property of the robot may include a position on an x-axis, a y-axis, and a z-axis in a three-dimensional coordinate. The rotation angle of the property of the robot may include a pitch angle for rotation around the x-axis, a yaw angle for rotation around the y-axis, and a roll angle for rotation around the z-axis. For example, the comparison processing circuit 204 may compare the simulation result with at least one of the position of the robot, the rotation angle of the robot, the position of the action of the robot, the rotation angle of the action of the robot, the joint position, and the joint rotation angle in each frame of the motion animation, to generate the comparison results.

The comparison processing circuit 204 may calculate an L1 loss value of a property of the robot in a frame of the simulation result (e.g., n-th frame of the simulation result) and the property of the robot in a corresponding frame of the motion animation (e.g., n-th frame of the motion animation). The greater the L1 loss value is, the greater the difference between the property of the robot in the simulation result and the property of the robot in the motion animation is. On the contrary, the smaller the L1 loss value is, the smaller the difference between the property of the robot in the simulation result and the property of the robot in the motion animation is. For example, the comparison processing circuit 204 may calculate an absolute difference between a property of the robot in a frame of the simulation result and the property of the robot in a corresponding frame of the motion animation, so as to generate an L1 loss value corresponding to the property of the robot. After the L1 loss value of the property of the robot in the frame of the simulation result and the property of the robot in the corresponding frame of the motion animation is calculated, the comparison processing circuit 204 may determine whether the calculated L1 loss value is greater than a threshold value. When determining that the L1 loss value is greater than the threshold value, this means that there is a significant difference between the simulation result and the motion animation, and the comparison processing circuit 204 may generate a comparison result indicating that there is a difference between the simulation result and the motion animation, to indicate that which action or behavior of the robot needs to be modified.

Figure 3:
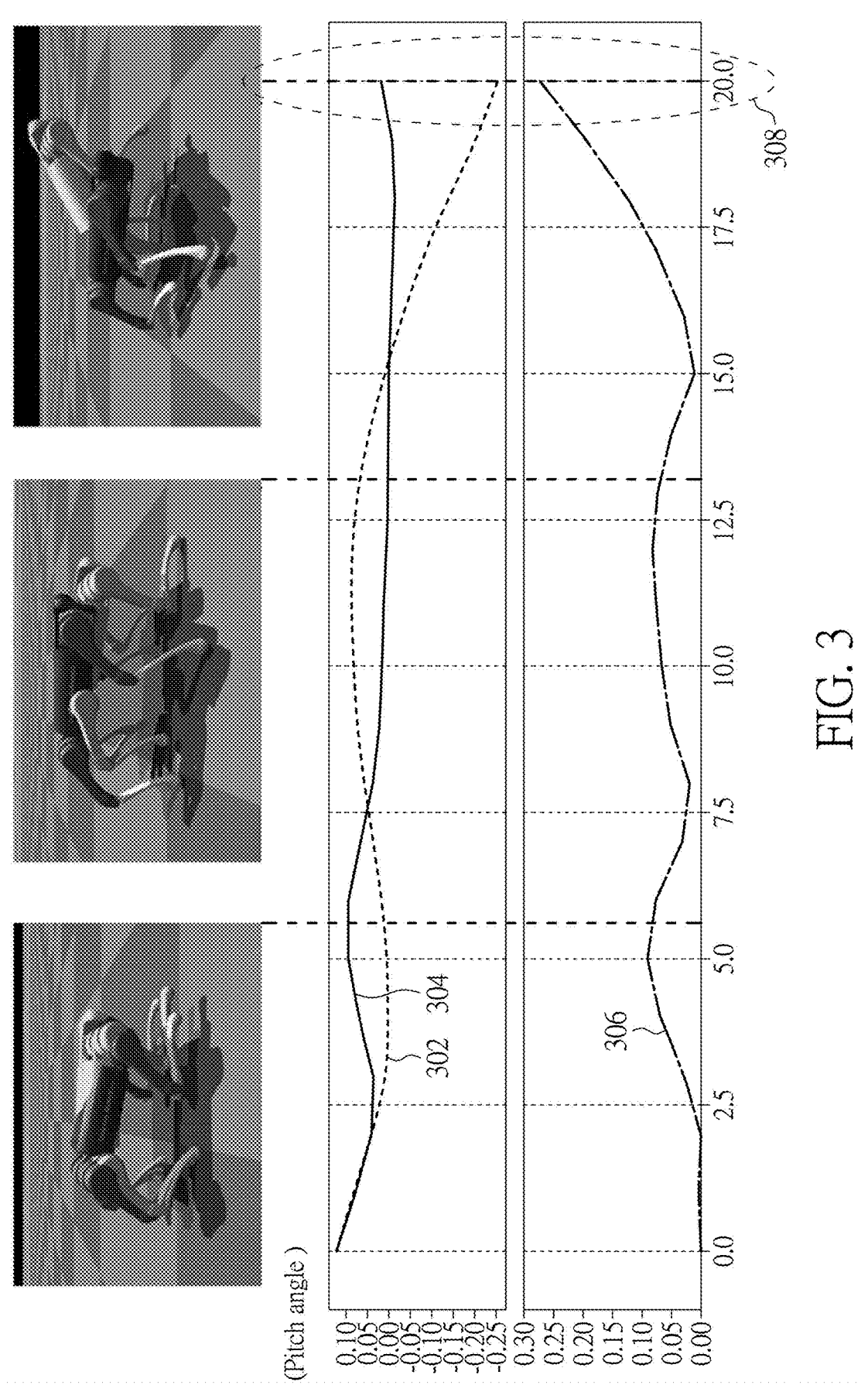
FIG. 3 is a schematic diagram of the property of the robot and the L1 loss value in the simulation result and the motion animation according to an embodiment of the present invention.

For example, please refer to FIG. 3. FIG. 3 is a schematic diagram of the property of the robot and the L1 loss value in the simulation result and the motion animation according to an embodiment of the present invention. As shown in FIG. 3, the solid line curve 302 represents the pitch angle (e.g., in degrees) of the robot in the motion animation. The dashed line curve 304 represents the pitch angle of the robot in the simulation result. The solid curve 306 represents the L1 loss value between the pitch angle of the robot in the simulation result and the pitch angle of the robot in the motion animation. The comparison processing circuit 204 may calculate the L1 loss value of the pitch angle of the robot in the simulation result and the pitch angle of the robot in the motion animation frame by frame. For example, the comparison processing circuit 204 may calculate an absolute difference between the pitch angle of the robot in a frame of the simulation result and the pitch angle of the robot in a corresponding frame of the motion animation so as to generate an L1 loss value corresponding to the pitch angle of the robot. For example, the threshold value of the L1 loss value is 0.25°. Referring to the dashed circle area marked as 308 shown in FIG. 3, the pitch angle of the robot in the motion animation is −0.25°, and the pitch angle of the robot in the simulation result is 0.02°. The comparison processing circuit 204 calculates that the absolute difference between the pitch angle of the robot in the simulation result and the pitch angle of the robot in the motion animation is 0.27°. That is, the L1 loss value corresponding to the pitch angle of the robot between the simulation result and the motion animation is 0.27°. Moreover, the comparison processing circuit 204 determines that the calculated L1 loss value (0.27°) is greater than the threshold value (0.25°). This means that there is a significant difference between the simulation result and the motion animation. Accordingly, the comparison processing circuit 204 generates a comparison result indicating that there is a difference between the simulation result and the motion animation, and the L1 loss value corresponding to the pitch angle of the robot between the simulation result and the motion animation is 0.27°.

In Step S206, the animation editing circuit 202 may load the motion animation and the robot model file with a unified robot description format (URDF). The robot model file with URDF may be an extensible markup language (XML) format file, which may be utilized to describe the robot structure, including the relationships and properties between components such as links, joints, and sensors. The robot model may be loaded into the animation editing circuit 202 to facilitate the operations of modeling, simulating and controlling for the robot. In step S206, when the comparison result indicates that there is a difference between the simulation result and the motion animation, the animation editing circuit 202 may edit and modify the motion animation according to the comparison result to generate an edited motion animation, and provide the edited motion animation to the physics simulation platform 10. The physics simulation platform 10 may perform subsequent simulation and training processing according to the edited motion animation. In more detail, after receiving the edited motion animation, the physics simulation platform 10 may perform subsequent simulation and training process according to the edited motion animation and the previously recorded simulation results, without re-executing the whole motion simulation and training process over again. Therefore, the embodiments of the present invention may effectively accelerate the motion training process of robot.

Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system or combination thereof. Examples of hardware can include analog, digital and/or mixed circuits known as microcircuit, microchip, or silicon chip. For example, the hardware may include application-specific integrated circuit (ASIC), field programmable gate array (FPGA), programmable logic device, coupled hardware components or combination thereof. In another example, the hardware may include general-purpose processor, microprocessor, controller, digital signal processor (DSP) or combination thereof. Examples of the software may include set(s) of codes, set(s) of instructions and/or set(s) of functions retained (e.g., stored) in a storage device, e.g., a non-transitory computer-readable medium. The non-transitory computer-readable storage medium may include read-only memory (ROM), flash memory, random access memory (RAM), subscriber identity module (SIM), hard disk, floppy diskette, or CD-ROM/DVD-ROM/BD-ROM, but not limited thereto. The real-time animation interactive editing system 1 of the embodiments of the invention may include the animation processing device 20 may include processing circuit (e.g., animation editing circuit 202, comparison processing circuit 204) and a storage device. Any of the abovementioned procedures and examples above may be compiled into program codes or instructions that are stored in the storage device or a computer-readable medium of the animation processing device 20. The processing circuit of the animation processing device 20 may read and execute the program codes or the instructions stored in the storage device storage device or computer-readable medium for realizing the abovementioned functions.

To sum up, the physics simulation platform 10 of the embodiment of the present invention may real-time return the simulation results generated based on the motion animation to the animation processing device 20 during simulation and training process, such that the animation processing device 20 may compare the simulation result with the motion animation to determine whether there is difference between the simulation result and the motion animation in real time. Moreover, the animation processing device 20 may edit and modify the motion animation to generate the edited motion animation based on the determined difference, and provide the edited motion animation to the physics simulation platform 10 for subsequent simulation training process. As a result, the embodiments of the present invention may real-time adjust the undesired parts of the original motion animation without re-executing the whole motion simulation and training process, thereby effectively accelerating motion training process of the robot.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for real-time animation interactive editing, comprising:

a physics simulation platform; and an animation processing device, comprising:

an animation editing circuit configured to obtain a motion animation associated with a robot and provide the motion animation to the physics simulation platform, such that the physics simulation platform performs a simulation processing based on the motion animation to generate a simulation result; and a comparison processing circuit, configured to real-time obtain the simulation result generated by the physics simulation platform and compare the simulation result with the motion animation to generate a comparison result;

wherein the comparison processing circuit compares a property of the robot in a frame of the simulation result with the property of the robot in a corresponding frame of the motion animation to generate the comparison result, wherein the property of the robot comprises at least one of a position, an angle of rotation, a position of an action, an angle of rotation of the action, a position of a joint and an angle of rotation of the joint of the robot;

wherein the comparison processing circuit calculates an L1 loss value of the property of the robot in the frame of the simulation result and the property of the robot in the corresponding frame of the motion animation, and when determining that the L1 loss value is greater than a threshold value, the comparison processing circuit generates the comparison result indicating that there is a difference between the simulation result and the motion animation;

wherein the animation editing circuit is configured to edit the motion animation to generate an edited motion animation according to the comparison result and provide the edited motion animation to the physics simulation platform.

2. The system of claim 1, wherein the comparison processing circuit compares the simulation result with the motion animation frame by frame to generate the comparison result.

3. The system of claim 1, wherein when the comparison result indicates that there is a difference between the simulation result and the motion animation, the animation editing circuit edits the motion animation according to the comparison result to generate the edited motion animation, and provides the edited motion animation to the physics simulation platform.

4. A method for real-time animation interactive editing, comprising:

obtaining a motion animation associated with a robot and providing the motion animation to a physics simulation platform, such that the physics simulation platform performs a simulation processing based on the motion animation to generate a simulation result;

real-time obtaining the simulation result generated by the physics simulation platform, and comparing the simulation result with the motion animation to generate a comparison result, wherein the method further comprising:

comparing a property of the robot in a frame of the simulation result with the property of the robot in a corresponding frame of the motion animation to generate the comparison result, wherein the property of the robot comprises at least one of a position, an angle of rotation, a position of an action, an angle of rotation of the action, a position of a joint and an angle of rotation of the joint of the robot;

calculating an L1 loss value of the property of the robot in the frame of the simulation result and the property of the robot in the corresponding frame of the motion animation; and generating the comparison result indicating that there is a difference between the simulation result and the motion animation when determining that the L1 loss value is greater than a threshold value; and editing the motion animation to generate an edited motion animation according to the comparison result, and providing the edited motion animation to the physics simulation platform.

5. The method of claim 4, wherein the step of comparing the simulation result with the motion animation to generate the comparison result comprises:

comparing the simulation result with the motion animation frame by frame to generate the comparison result.

6. The method of claim 4, wherein the step of editing the motion animation according to the comparison result to generate the edited motion animation and providing the edited motion animation to the physics simulation platform comprises:

editing the motion animation to generate the edited motion animation according to the comparison result, and proving the edited motion animation to the physics simulation platform when the comparison result indicates that there is a difference between the simulation result and the motion animation.

* * * * *